US012513443B2

(12) United States Patent
Stalker Wilde

(10) Patent No.: US 12,513,443 B2
(45) Date of Patent: Dec. 30, 2025

(54) BODY MICROPHONE AND TRANSMITTER RIG

(71) Applicant: Julie Maxwell Stalker Wilde, New York, NY (US)

(72) Inventor: Julie Maxwell Stalker Wilde, New York, NY (US)

( * ) Notice: Subject to any disclaimer, the term of this patent is extended or adjusted under 35 U.S.C. 154(b) by 449 days.

(21) Appl. No.: 18/056,076

(22) Filed: Nov. 16, 2022

(65) Prior Publication Data

US 2023/0099525 A1 Mar. 30, 2023

Related U.S. Application Data

(60) Provisional application No. 63/261,880, filed on Sep. 30, 2021.

(51) Int. Cl.
*H04R 1/08* (2006.01)
*H04R 3/00* (2006.01)

(52) U.S. Cl.
CPC ................ *H04R 1/08* (2013.01); *H04R 3/00* (2013.01); *H04R 2201/023* (2013.01); *H04R 2420/07* (2013.01)

(58) Field of Classification Search
CPC . H04R 1/025; H04R 1/08; H04R 3/00; H04R 2201/023; H04R 2420/07
USPC .......................................................... 381/91
See application file for complete search history.

(56) References Cited

U.S. PATENT DOCUMENTS

| | | | | |
|---|---|---|---|---|
| 5,305,244 | A | 4/1994 | Newman et al. | |
| 6,137,675 | A | 10/2000 | Perkins | |
| 6,179,666 | B1 | 1/2001 | Osborn | |
| 10,148,305 | B2 * | 12/2018 | Kovac | H04B 1/385 |
| 10,595,603 | B2 | 3/2020 | Maddox et al. | |
| 10,678,496 | B2 | 6/2020 | England | |
| 10,939,494 | B2 | 3/2021 | Shinn et al. | |
| 2003/0104842 | A1 | 6/2003 | Choi et al. | |
| 2005/0272476 | A1 | 12/2005 | Eaton et al. | |
| 2007/0111754 | A1 | 5/2007 | Marshall et al. | |
| 2007/0147631 | A1 * | 6/2007 | Segawa | H04R 1/04 381/79 |
| 2013/0228603 | A1 * | 9/2013 | Grech | A45F 5/021 224/676 |
| 2016/0366990 | A1 | 12/2016 | Smith | |
| 2018/0288527 | A1 | 10/2018 | Riedel | |
| 2020/0394993 | A1 | 12/2020 | Graves | |
| 2021/0046234 | A1 | 2/2021 | Zilbershlag | |
| 2022/0087405 | A1 * | 3/2022 | Rodriguez | A45F 5/00 |

* cited by examiner

*Primary Examiner* — Paul Kim
(74) *Attorney, Agent, or Firm* — Dunlap Bennett & Ludwig, PLLC; Anna L. Kinney

(57) ABSTRACT

A microphone and transmitter rig includes an elongated strap. The strap has a first surface, a second surface, a first end, and a second end. On the first surface, a fastener is attached at the first end and a non-slip surface is attached at the second end. On the second surface, a clip is attached near the second end. The strap clips to a microphone and wraps around the microphone and a transmitter. The rig reduces sound interference and simplifies placement.

11 Claims, 4 Drawing Sheets

BODY MICROPHONE AND TRANSMITTER RIG

CROSS-REFERENCE TO RELATED APPLICATION

This application claims the benefit of priority of U.S. provisional application No. 63/261,880, filed Sep. 30, 2021, the contents of which are herein incorporated by reference.

BACKGROUND OF THE INVENTION

The present invention relates to microphone rigs and, more particularly, to a body microphone and transmitter rig.

Body microphones are regularly used on television and film productions, hidden among an actor's clothing. The body microphones must be secured firmly to the actor in a position that captures sound while requiring minimal maintenance or re-positioning. Sound technicians or other stagehands typically assist the actor in securing the body microphone. This process leads to unwanted touching of the actor by sound technicians and stagehands. The actor often is not comfortable with the process and consequently wants more control over the body microphone and rigging process.

A transmitter transmits a sound captured by the body microphone. The transmitter and the body microphone are connected by a cable wire. A loose or dangling cable wire moves when an actor's body changes position. The movement of the cable wire interferes with the sound. Sound interferences may be generated by the cable wire rubbing onto clothing and producing static or by bumping into an object creating a noise. Additional sound interferences are caused when the microphone rubs onto clothing or bumps into an object. These interferences are undesirable.

As can be seen, there is a need for a body microphone rig which the actor can put on themselves without assistance that also reduces sound interferences.

SUMMARY OF THE INVENTION

In one aspect of the present invention, a microphone and transmitter rig device includes an elongated strap having a first surface, a second surface, a first end, and a second end; with a fastener affixed at the first end and a non-slip surface affixed is affixed at the second end on the first surface, and a clip is affixed on the second surface proximate to the second end.

In another aspect of the present invention, a method of attaching a microphone and a transmitter to a user includes affixing the microphone to the clip; placing the transmitter on the non-slip surface; wrapping the strap around the transmitter, the microphone, and the clip; and securing the strap with the fastener.

Advantageously, the inventive device may reduce sound interferences typically experienced with loose or dangling cable wires or sound interferences from bumping into objects. For example, may prevent wires from causing static or other unwanted effects on the attached microphone or headphones.

Advantageously, the inventive device enables a user, such as an actor or other performer, e.g., a singer or artist, to rig a microphone to themselves and avoid unnecessary touching from staff.

The inventive device enables the microphone and transmitter to be handled as one piece, simplifying and speeding up placement on the user.

These and other features, aspects and advantages of the present invention will become better understood with reference to the following drawings, description, and claims.

DETAILED DESCRIPTION OF THE INVENTION

Figure 1:
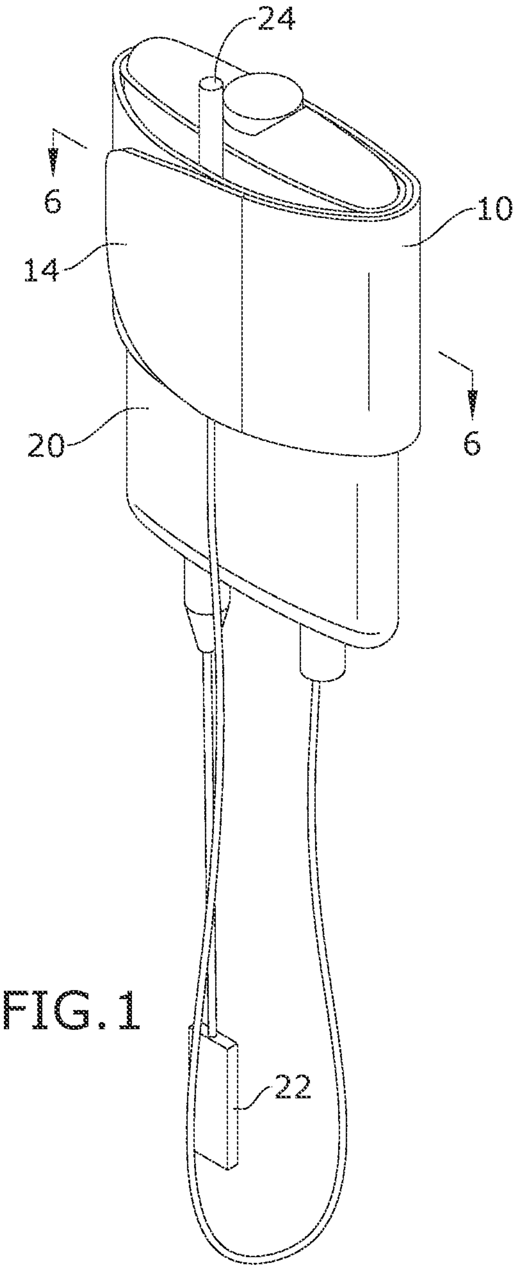
FIG. 1 is a front perspective view of a microphone and transmitter rig according to an embodiment of the present invention in a closed condition.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

As used herein, the term "rig" refers to an assembly including a microphone, a transmitter, and securing means that hold the microphone to the transmitter, minimizing cord movement and contact of the microphone with nearby surfaces. In some embodiments, the rig further comprises an attachment means to affix the assembly to a user.

The terms "band" and "strap" are sometimes used interchangeably herein.

As used herein, the term "touch fastener" refers to a hook-and-loop fastener and the like, as well as to the hook portion of the fastener and to the loop portion of the fastener independently. The hook portion of the fastener and the loop portion of the fastener are reversibly mateable.

Broadly, an embodiment of the present invention provides a rig for a body microphone and a transmitter. The rig comprises securing means which may include a band with a fastener, a cable clip, a non-slip surface, and a strap.

A general overview of the various features of the invention will be provided, with a detailed description following.

The rig may comprise an elongated strap with a first surface, a second surface, a first end, and a second end. The elongated strap may have a non-slip surface at the first end of the first surface and a fastener at the second end of the first surface. The elongated strap may have a cable clip on the second surface proximate to the first end and a mating fastener on the second surface at a position aligned with the fastener on the first surface when the strap is wrapped in a closed condition.

The fastener may be affixed to a first end of the strap on the front side of the strap, a rear side of the strap, or both. The fastener may be a touch fastener.

The cable clip secures a microphone to the rig. The cable clip may be a clip or any other suitable component for securing a microphone. The cable clip may be affixed near a second end of the strap on the front side of the strap.

A non-slip surface may be bonded or affixed to the rear side of the second end of the strap. The non-slip surface may be adjacent to the clip.

In some embodiments, the assembly may further include a band operative to secure the rig to the user's body or clothing. Fasteners may be affixed to any suitable regions of the band, including regions selected from the group consisting of: a first surface of the band, a second surface of the band, a first end of the band, a second end of the band, and any combination thereof. The band may wrap around part of the user's clothing and be held in place with the fastener or fasteners. Alternatively, the fasteners of the band may reversibly couple with fasteners on the user's clothing. The band may be wrapped into the rig strap and/or may be fastened to the strap, whether removably or permanently. The band may, for example, be wrapped in the strap in a position perpendicular to the strap.

The materials of manufacture are not particularly limited. The strap and the band may independently be any suitable material, such as a strip of elastic fabric, rubber, or plastic. The non-slip surface may be any suitable material, such as rubber or plastic.

The dimensions of the components are not particularly limited herein. For example, in some embodiments of the present invention, the strap may be about 2 inches wide and about 9 inches in length. Independently, the band may be any suitable dimensions, such as about 0.5 inches wide and about 2 inches to about 5 inches in length.

To assemble and utilize the inventive rig, a microphone cable may be attached to the cable clip. The non-slip surface may be placed firmly onto a surface of the transmitter. The strap may then be wrapped around the transmitter. The strap may be secured around the transmitter with a fastener on the loose end of the strap. The fastener may grip the strap material and/or the fastener may mate with a fastener on a surface of the wrapped portion of the strap aligned with the loose end. The microphone cable or excess cords may be folded or tucked into the strap in the wrapping process, concealing and limiting movement of cables and cords. The rig may then be placed or positioned anywhere on a person's body such as hidden within an article of clothing. For example, the rig may fit snugly in a pocket or article of clothing on the user.

Referring now to the Figures, FIG. 1 illustrates a microphone and transmitter rig according to an embodiment of the present invention, including a transmitter pack 20 enclosed within a wrapped strap 10.

Figure 2:
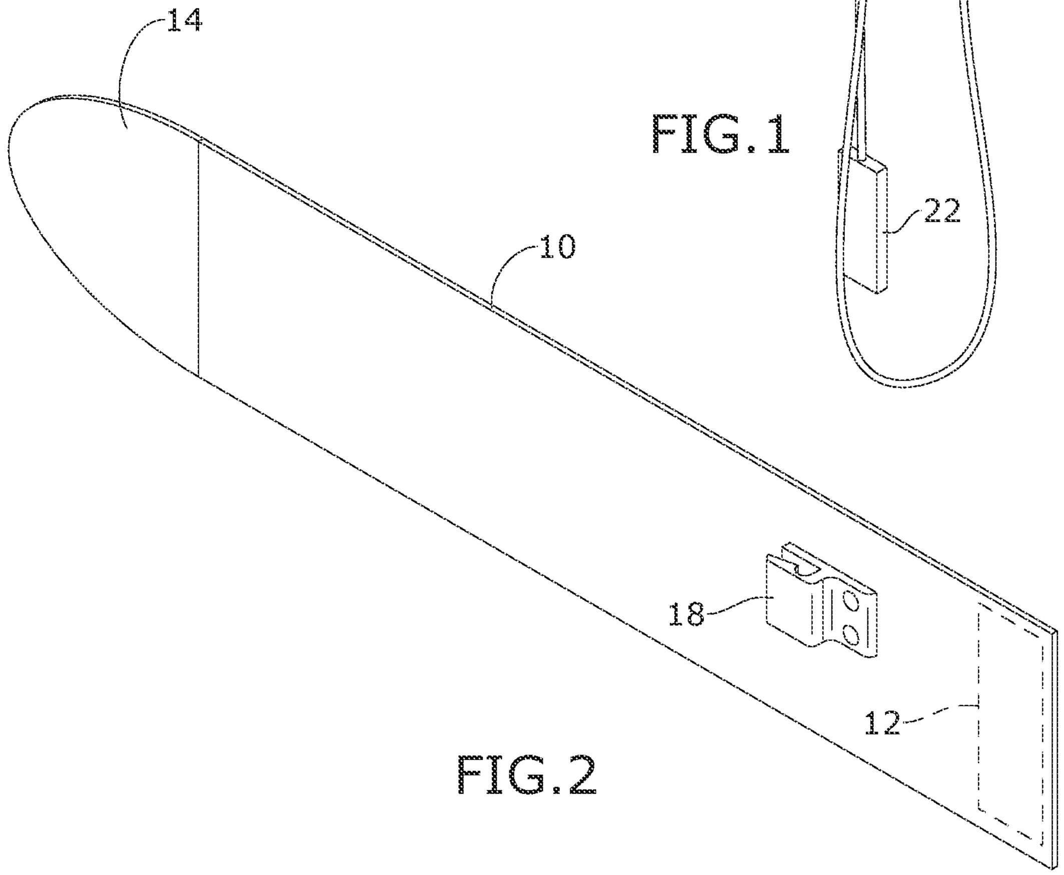
FIG. 2 is a front perspective view of a band thereof.
Figure 3:
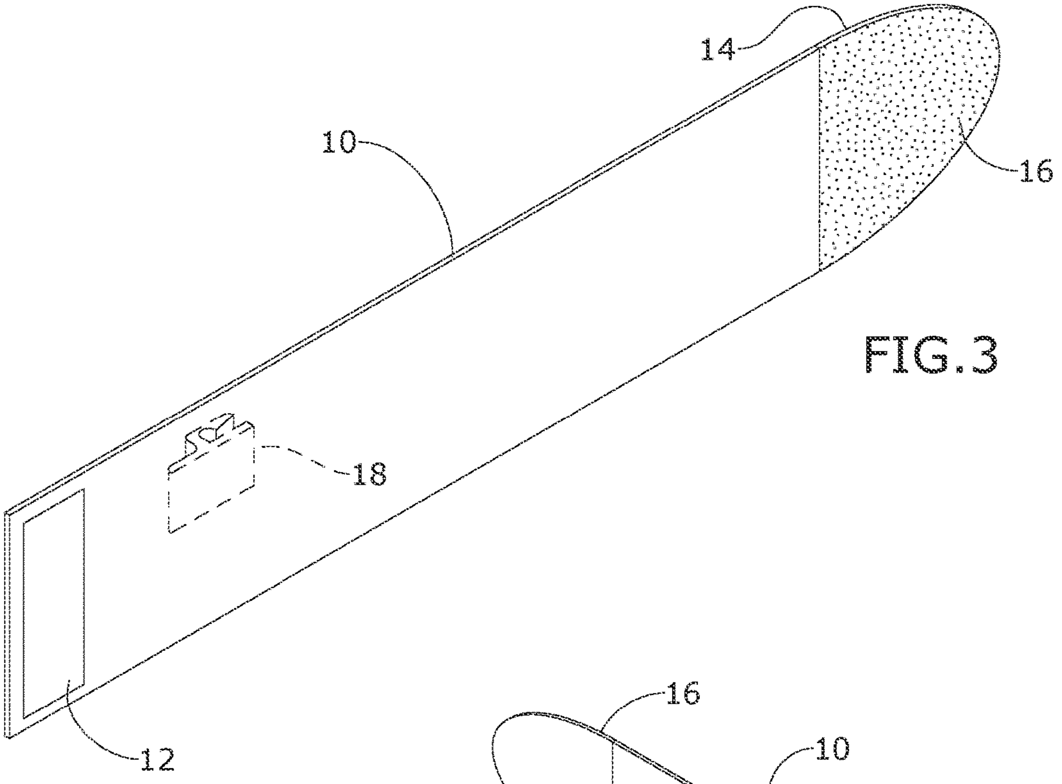
FIG. 3 is a rear perspective view thereof.

The strap 10 as shown in FIGS. 2 and 3 is an elongated strip of a material having a first surface, a second surface opposite the first surface, a first end having right angles, and a rounded second end opposite the first end. The first surface includes a non-slip pad 12 at the first end and a second fastener 16 at the second end. The second surface has a clip 18 affixed to the strap 10 proximate the first end. The clip 18 grips the microphone 24 cable, maintaining the microphone in a predetermined position relative to the transmitter pack 20. The second end of the second surface may or may not have a first fastener 14. The strap 10 is then wrapped around the transmitter pack 20. As shown, the transmitter pack 20 comprises a receiver equipped with an antenna 22 in electronic communication therewith.

Figure 4:
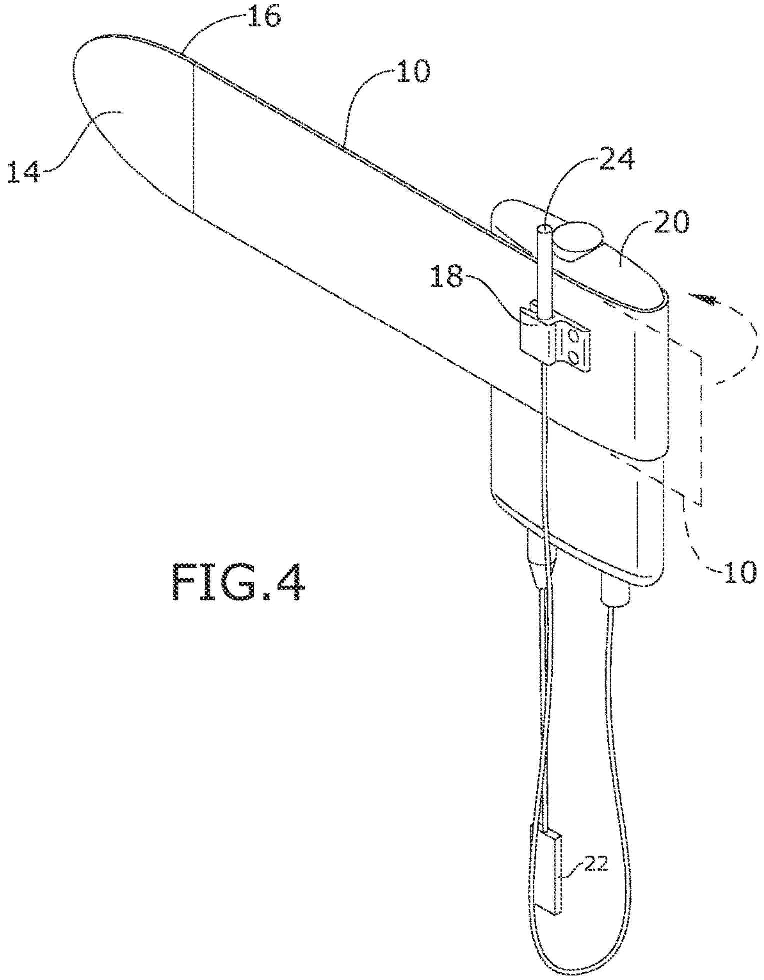
FIG. 4 is a front perspective view of the microphone and transmitter rig of FIG. 1, shown in an open condition.
Figure 5:
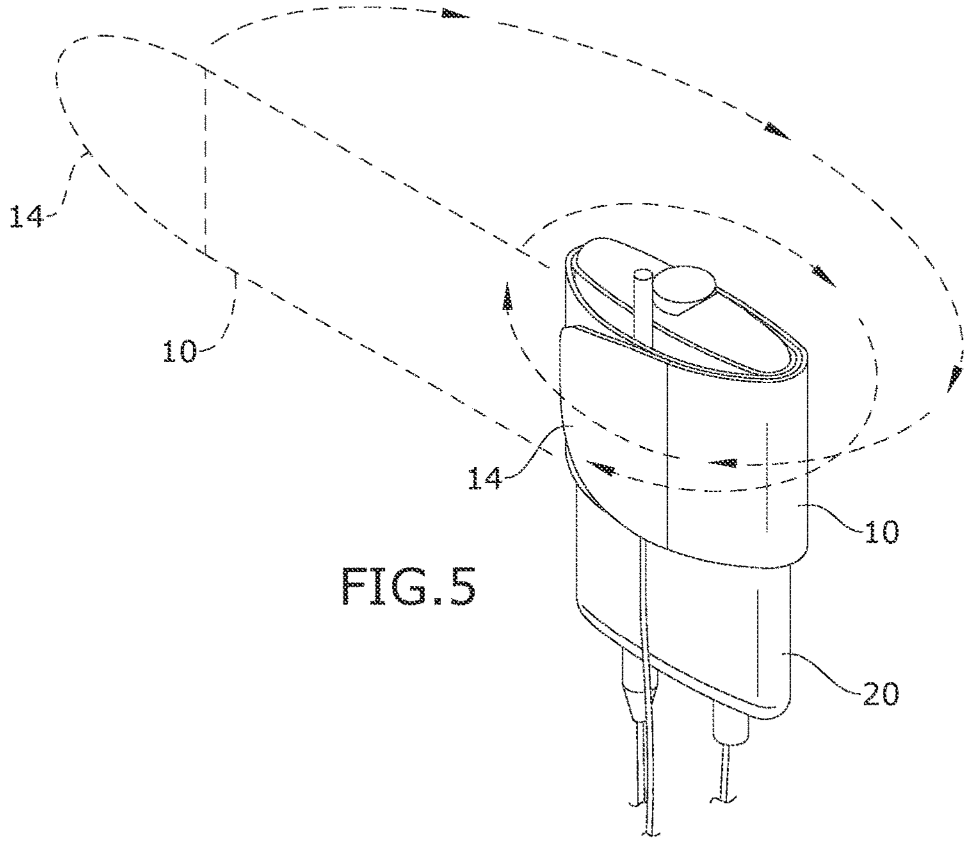
FIG. 5 is another front perspective view thereof, illustrating a method of wrapping the band to achieve the closed condition.
Figure 6:
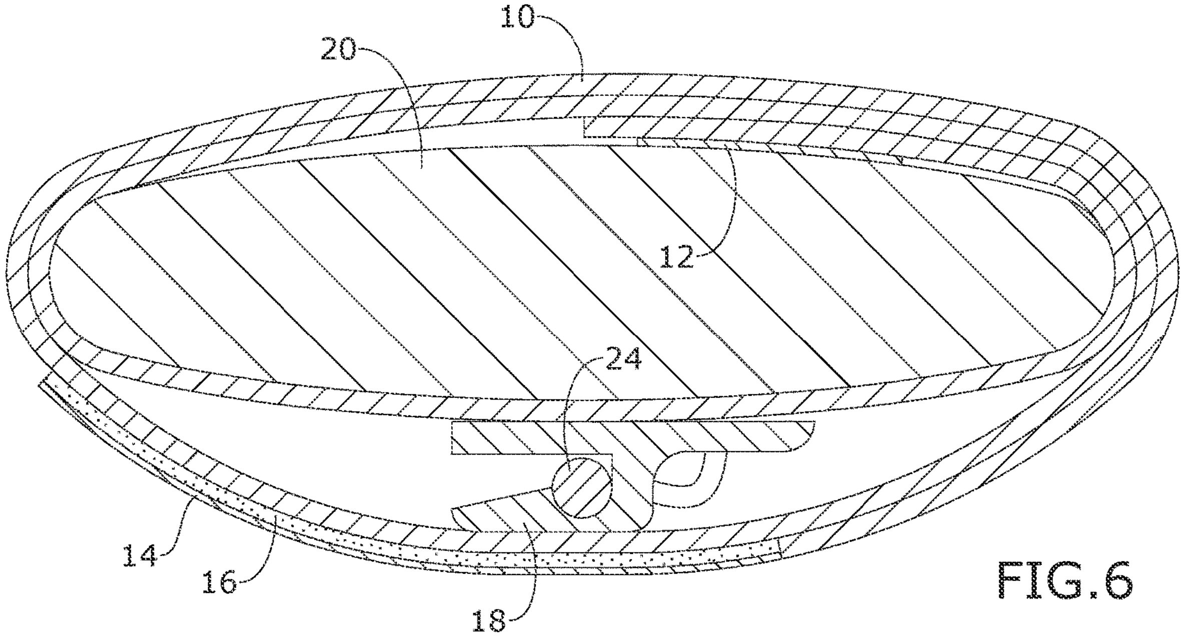
FIG. 6 is a sectional view thereof, taken on line 6-6 of FIG. 1.

As shown in FIGS. 4 and 5, the rig is assembled by installing the microphone 24 into the clip 18 and wrapping the strap 10 around the transmitter pack 20 with the non-slip surface 12 contacting a surface of the transmitter pack 20. As the strap 10 wraps around the transmitter pack 20, it also encloses the clip 18 with the microphone 24. The wrapped strap 10 may be held in place with mating fasteners 14, 16, as seen in FIG. 6.

Figure 7:
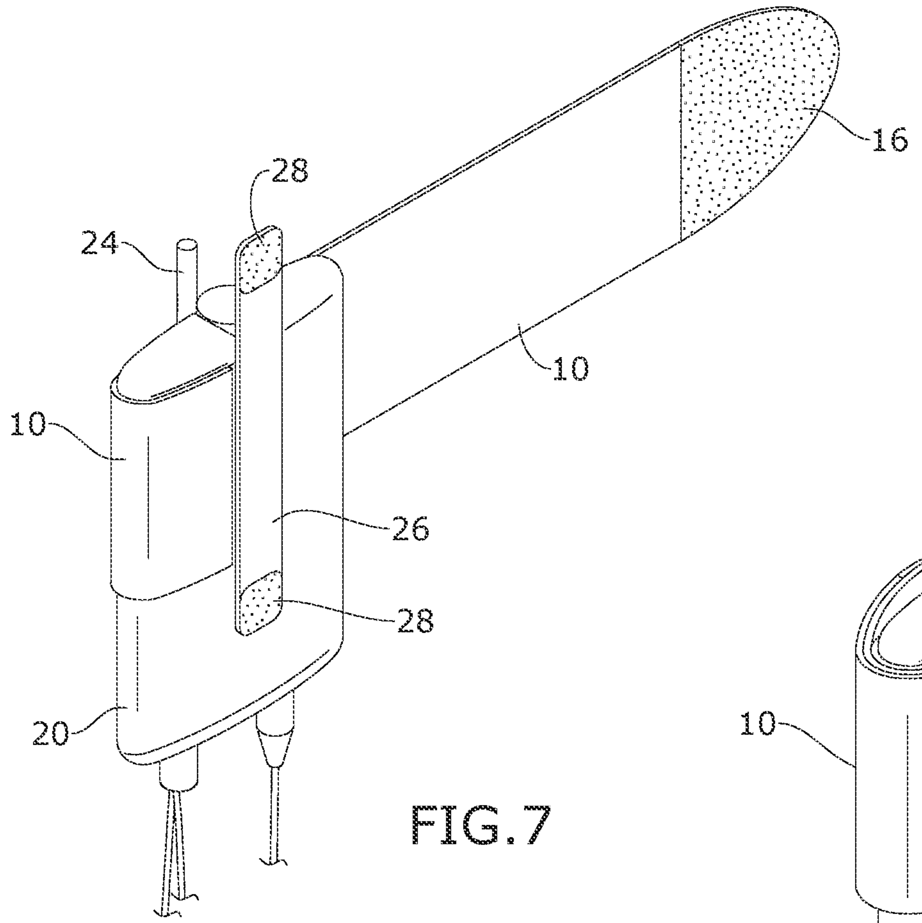
FIG. 7 is a rear perspective view of a microphone and transmitter rig according to another embodiment of the present invention, shown in an open condition.
Figure 8:
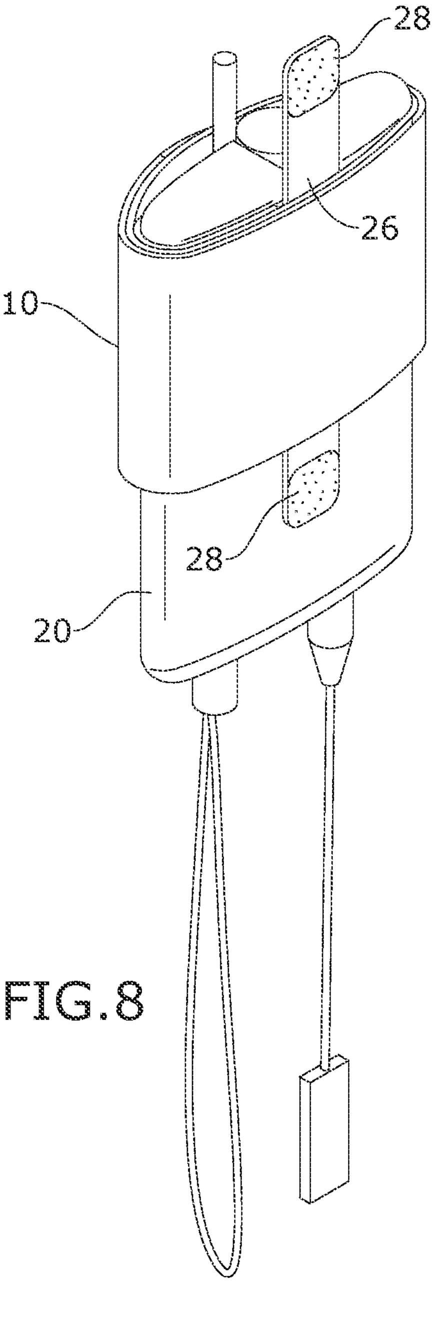
FIG. 8 is another rear perspective view thereof, shown in a closed condition.

FIGS. 7-8 illustrate another embodiment of the present invention, including an elongated attachment strap 26 with fastener pads 28 at each end. While the fastener pads 28 are shown at opposite ends of the same surface, the fastener pads 28 may be placed on opposite surfaces at opposite ends. The attachment strap 26 may be affixed to the strap 10 at a position opposite the non-slip pad 12. The attachment strap 26 may wrap around a portion of a user's body and/or clothing to attach the rig to the user and may be held in place by coupling the fastener pads 28. Alternatively, the fastener pads may couple to mated fastener pads on a device or garment worn by the user.

It should be understood, of course, that the foregoing relates to exemplary embodiments of the invention and that modifications may be made without departing from the spirit and scope of the invention as set forth in the following claims.

What is claimed is:

1. A microphone and transmitter rig device comprising:
- an elongated strap having a first end and a second end opposite the first end;
- a fastener on a first surface of the strap aligned along the first end;
- a non-slip surface on the first surface proximate the second end; and
- a clip on a second surface of the strap proximate to the second end and spaced longitudinally from the non-slip surface;
- wherein the clip is configured to grip a microphone cable to position a microphone relative to a transmitter pack when the elongated strap is wound around the transmitter pack with the clip enclosed within the wound strap.

2. The microphone and transmitter rig device of claim 1, wherein the fastener is a touch fastener operative to fasten the first surface to the second surface when the elongated strap is in a wound position.

3. The microphone and transmitter rig device of claim 1, wherein the elongated strap further comprises a second fastener on the second surface opposite the fastener on the first surface.

4. The microphone and transmitter rig device of claim 1, further comprising a band affixed on the second surface at the second end, in an orientation perpendicular to the elongated strap; wherein the band is operative to fasten the elongated strap to a substrate.

5. The microphone and transmitter rig device of claim 1, wherein the clip comprises a substantially rectangular base and a curved gripping portion extending from the base to form a cable-receiving channel.

6. The microphone and transmitter rig device of claim 1, wherein the second end has right angles.

7. The microphone and transmitter rig device of claim 1, wherein the first end is rounded.

8. A method of attaching a microphone and transmitter to a user comprising:
- providing the microphone and transmitter rig device of claim 1;
- affixing a microphone to the clip;
- placing a transmitter on the non-slip surface;
- wrapping the strap around the transmitter, the microphone, and the clip; and
- securing the strap with the fastener.

9. The method of claim 8, further comprising tucking excess cable wire into the strap prior to securing the strap.

10. The method of claim 8, further comprising, prior to wrapping the strap:

providing a fastenable band on the second surface at the second end of the strap in a position perpendicular thereto; and, subsequent to wrapping the strap, fastening the fastenable band to a user.

11. The method of claim 8, further comprising, subsequent to securing the strap, placing the microphone and transmitter rig device into a user's article of clothing.

* * * * *